US011204345B2

United States Patent
Okura (10) Patent No.: US 11,204,345 B2
(45) Date of Patent: Dec. 21, 2021

(54) PREPARATIVE METHOD AND APPARATUS FOR A THIN-LAYER CHROMATOGRAPH

(71) Applicant: Yamazen Corporation, Osaka (JP)

(72) Inventor: Kihachiro Okura, Osaka (JP)

(73) Assignee: YAMAZEN CORPORATION, Osaka (JP)

( * ) Notice: Subject to any disclaimer, the term of this patent is extended or adjusted under 35 U.S.C. 154(b) by 86 days.

(21) Appl. No.: 16/250,399

(22) Filed: Jan. 17, 2019

(65) Prior Publication Data

US 2020/0182839 A1 Jun. 11, 2020

(30) Foreign Application Priority Data

Dec. 5, 2018 (JP) .............................. JP2018-227940

(51) Int. Cl.
| | | |
|---|---|---|
| *B01D 15/10* | (2006.01) | |
| *G01N 30/91* | (2006.01) | |
| *G01N 30/92* | (2006.01) | |
| *G01N 30/94* | (2006.01) | |
| *G01N 30/95* | (2006.01) | |

(52) U.S. Cl.
CPC ............. *G01N 30/91* (2013.01); *B01D 15/10* (2013.01); *G01N 30/92* (2013.01); *G01N 30/94* (2013.01); *G01N 30/95* (2013.01)

(58) Field of Classification Search
CPC ........ G01N 30/91; G01N 30/92; G01N 30/94; G01N 30/95; B01D 15/10
See application file for complete search history.

(56) References Cited

U.S. PATENT DOCUMENTS 3,766,884 A * 10/1973 Rosenthal .............. G01N 30/91
118/58

FOREIGN PATENT DOCUMENTS

| DE | 10036293 A1 * | 2/2002 | ............ G01N 30/95 |
|---|---|---|---|
| EP | 0075867 A1 | 4/1983 | |
| JP | U S56 (1981)-9039 | 7/1979 | |
| JP | S56-9039 A | 1/1981 | |
| JP | 2005-523456 A | 8/2005 | |
| JP | 2010-271157 A | 12/2010 | |
| JP | 2012-177605 A | 9/2012 | |

(Continued)

OTHER PUBLICATIONS

Luftmann, H., "A simple device for the extraction of TLC spots: direct coupling with an electrospray mass spectrometer", Anal Bioanal Chem, 378, 964-968. (Year: 2004).*

(Continued)

*Primary Examiner* — Benjamin L Lebron
(74) *Attorney, Agent, or Firm* — Polsinelli PC (57) ABSTRACT

To provide a preparative thin layer chromatography method capable of acquiring a target spot efficiently using a simple and convenient method without the possibility of decomposition of a component in a spot. The preparative thin layer chromatography method is a preparative method for dispensing a spot from a thin layer chromatography plate and includes a process 1 that forms a groove by removing the carrier at the circumferential edge of a spot to be dispensed, a process 2 that inserts a nozzle having a packing part at the tip thereof into the groove formed in the process 1, a process 3 that discharges a solvent through the nozzle, and a process 4 that sucks the solvent in which a spot component has been dissolved.

20 Claims, 6 Drawing Sheets

(56) References Cited

FOREIGN PATENT DOCUMENTS

JP        2018-009842 A    1/2018
WO     WO 03/090249 A2    10/2003

OTHER PUBLICATIONS

Luftmann, H., et al, "Automated interface for hyphenation of planar chromatography with mass spectrometry", Rapid Communications in Mass Spectrometry, 21, 3772-3776. (Year: 2007).*
Machine translation of Luftmann DE 10036293A1.*

* cited by examiner

PREPARATIVE METHOD AND APPARATUS FOR A THIN-LAYER CHROMATOGRAPH

CROSS REFERENCE TO RELATED APPLICATIONS

This application claims priority to Application No. 2018-227940 filed in Japan on Dec. 5, 2018. The entire contents of each application are hereby incorporated by reference.

BACKGROUND OF THE INVENTION

1. Field of the Invention

The present invention relates to a preparative thin layer chromatography method and a preparative thin layer chromatography device.

2. Description of the Related Art

Thin layer chromatography is an analysis method for taking advantage of differences in movement speed between chemical compounds when a sample is applied to a carrier formed like a thin layer and an organic solvent or water moves by capillary action. This type of analysis method is advantageous in that it is simple and convenient and only a small quantity of a sample is needed for analysis. Accordingly, this analysis method is generally used in synthesis chemistry fields. This type of method is mainly used for analysis, but it is hardly used for extracting.

Extracting of a component separated by this type of thin layer chromatography is not easy. This is because the separated component is present in a carrier such as silica gel and the acquisition of only the target component from the carrier is difficult. Conventionally, the target component in the carrier has been extracted by shaving only the part of the carrier to which the target component has been attached, mixing this with a solvent, and performing filtration, for example.

Since this type of method takes effort and the target object to be extracted is very small, however, the result corresponding to the effort may not be acquired in many cases. Accordingly, extracting and analysis have been generally made by performing preparative chromatography while referencing the result of thin layer chromatography.

On the other hand, if the component separated by thin layer chromatography can be simply and conveniently extracted or analyzed, effort in synthesis or extracting is reduced, thereby contributing to rationalization of research and development. Furthermore, if the extracted spot can be directly provided for another analysis (such as, for example, mass analysis) unit, there is another advantage in that the substance corresponding to the spot can be known by thin layer chromatography.

European Patent Application Publication No. 0075867 discloses a device that acquires spots on a thin layer chromatograph. However, when extracting is performed using this type of method, since a solvent diffuses into a carrier on the thin layer chromatograph, it is difficult to selectively acquire only the component of a target spot in a high yield. Accordingly, the object described above cannot be achieved sufficiently.

JP-A-2012-177605 discloses a method that detaches a measurement specimen by blowing hot air onto a thin layer chromatography plate and ionizing the specimen and then supplies the specimen to mass analysis. However, this method can be applied only to highly volatile compounds and some compounds may be decomposed by heating. Furthermore, since extracting cannot be performed, another problem arises in that application to analysis methods other than mass analysis cannot be performed.

JP-A-2010-271157 discloses a method that performs transfer from a thin layer chromatography board to a PVDF film, measures a two-dimensional range via an imaging mass analysis device using the PVDF film having undergone transfer, and acquires a mass spectrum for each of many measured points. However, this type of method is not a simple and convenient analysis method and cannot be used to check the reaction result in a normal synthetic experiment.

SUMMARY OF THE INVENTION

The invention addresses the above problems with an object of providing a preparative method for extracting a spot component on a thin layer chromatograph capable of efficiently acquiring a target spot using a simple and convenient method without possibility of decomposition of a component in the spot.

The invention is a preparative thin layer chromatography method for extracting a spot from a thin layer chromatography plate, the preparative method including a process 1 that forms a groove by removing a carrier at a circumferential edge of the spot to be extracted; a process 2 that inserts a nozzle having a packing part at a tip thereof into the groove formed in the process 1; a process 3 that discharges a solvent through the nozzle; and a process 4 that sucks the solvent in which a spot component has been dissolved.

Preferably, the groove in the process 1 is formed by rotating a groove forming unit while pushing the groove forming unit against the carrier.

The invention is a preparative thin layer chromatography device that performs the preparative thin layer chromatography method described above, the preparative device including a groove forming unit (F-1) that forms the groove by removing the carrier at the circumferential edge of the spot; and a nozzle (F-2) having, at the tip thereof, the packing part insertable into the groove formed by the groove forming unit.

The invention is a preparative thin layer chromatography device that performs the preparative thin layer chromatography method described above, the preparative device including a thin layer chromatography plate placement unit (A); a spot detection light illuminating unit (B); a thin layer chromatography plate image taking unit (C); an image displaying unit (D) in which an image taken by the thin layer chromatography plate image taking unit (C) is displayed; a spot specifying unit (E) used by an operator to specify a spot position in the image displayed in the image displaying unit (D); a collecting unit (F) that collects a spot at the position specified by the operator using the spot specifying unit (E), the collecting unit (F) including a groove forming unit (F-1) that forms a groove by removing the carrier at a circumferential edge of the spot and a nozzle (F-2) having, at the tip thereof, the packing part insertable into the groove formed by the groove forming unit.

In addition, the invention is a preparative thin layer chromatography method for extracting a spot from a thin layer chromatography plate, the preparative method including a process 1 that performs pretreatment for preventing a solvent from diffusing into a carrier layer in the thin layer chromatography plate; a process 2 that removes a solid part around the spot from which a sample is acquired on the thin layer chromatography plate, the solid part being generated in the process 1; a process 3 that discharges a solvent onto the spot on the thin layer chromatography plate through a nozzle; and a process 4 that sucks the solvent in which a spot component has been dissolved.

Preferably, the process 1 described above is a process that forms a groove by removing the carrier at the circumferential edge of the spot to be extracted.

Preferably, the groove in the process 1 is formed by rotating a groove forming unit while pushing the groove forming unit against the carrier.

The invention is a preparative thin layer chromatography device that performs the preparative thin layer chromatography method described above, the preparative device including a pretreatment unit (F-1) that performs the process 1; a solid part removing unit (F-3) that removes the solid part around the spot; and a nozzle (F-2) discharges the solvent to or sucks the solvent from the spot.

Preferably, the pretreatment unit described above is a groove forming unit that forms the groove by removing the carrier at the circumferential edge of the spot.

The preparative thin layer chromatography method according to the invention can easily acquire the spot separated by thin layer chromatography with a simple and convenient operation in a short time. In addition, the preparative thin layer chromatography method can acquire the spot in a high yield without re-mixing the separated spot and penetration and diffusion of the extracted solvent into surroundings. Furthermore, a process of heating or the like is not necessary, so spot components do not deteriorate. Furthermore, spot components can be acquired in the state of a solution, so spot components can be provided for any chemical analysis.

Furthermore, the preparative thin layer chromatography device according to the invention can perform the preparative thin layer chromatography method described above simply, conveniently, and efficiently.

Furthermore, the preparative thin layer chromatography method according to the invention can prevent crud and clogging of a pipe caused when sucking a solution in which a sample has been dissolved.

DESCRIPTION OF THE PREFERRED EMBODIMENTS

The invention will be described in detail below.

A first aspect of the invention is a preparative thin layer chromatography method. That is, the first aspect is a preparative method for acquiring components included in a spot separated by thin layer chromatography.

Figure 1:
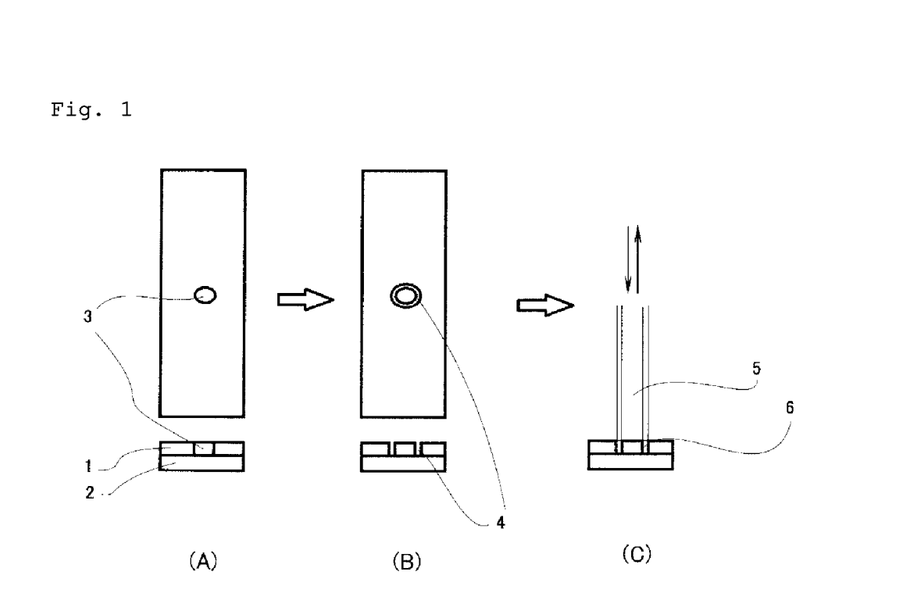
FIG. 1 is a schematic view illustrating a procedure of a preparative thin layer chromatography method according to the invention.

The preparative method according to the invention is illustrated in FIG. 1 as a schematic view. The following description is based on FIG. 1.

FIG. 1A illustrates a thin layer chromatography plate on which a sample has been deployed. The drawing above is a schematic view illustrating the thin layer chromatography plate seen from above and the drawing below is a schematic view illustrating a cross section of the spot position. The thin layer chromatography plate has a structure in which a carrier 1 is formed on a supporting plate 2 and a spot part 3 having undergone thin layer chromatography includes separated chemical compounds therein. The sample to be acquired in the invention is present in the carrier 1.

A process 1 of the invention forms a groove 4 by removing the carrier at the circumferential edge of the spot from which the sample is acquired, as illustrated in FIG. 1B. Since the carrier is a layer made of fine powder such as silica, the carrier can be easily removed by shaving the surface thereof using a blade, a needle, or the like. Such removal of the carrier is preferably performed until the supporting plate 2 is exposed to the surface. This is because, if the carrier 1 remains in the shaven part even after removal, the solvent leaks externally through the remaining part and an object of the invention may not be achieved sufficiently.

A process 2 of the invention is a process that inserts a nozzle 5 having a packing part 6 at the tip thereof into the groove 4 formed in the process 1, as illustrated in FIG. 1C.

The nozzle used here has a tubular shape with a hollow part through which liquid can pass and has the packing part 6 at the tip thereof. The packing part is made of a material having high adhesiveness like an elastic body such as rubber. When the packing part is inserted into the groove formed in the process 1 described above, the spot part 3 of the carrier including the sample is blocked from the other part of the carrier and liquid cannot move between these parts.

When the solvent is discharged through the nozzle in the state described above in a process 3, the discharged solvent is supplied only to the spot part 3 and does not diffuse into the other part of the carrier. Accordingly, a component other than the target spot 3 is not mixed, so liquid can be efficiently sucked in a process 4 to be performed next and the sample can be collected in a high yield.

The individual processes will be described below more specifically.

Process 1

The process 1 is a process that forms the groove 4 by removing the carrier at the circumferential edge of the spot to be extracted. The method for performing the process described above is not particularly limited and may be a method that pushes a spot-shaped blade, a method that shaves the carrier by following the surface using a sharp shaving member such as a needle or a blade, or the like.

The groove described above is preferably formed by rotating a groove forming unit such as a blade or a needle while pushing the groove forming unit against the carrier. Since the method described above can form a uniform groove stably, the sample can be acquired without causing a trouble in the following process.

The shape and the size of the groove to be formed is not particularly limited and the groove may have any size and any shape according to the purpose. However, since the packing part is inserted into the formed groove in the subsequent process, the size and the shape need to substantially coincide with the shape of the packing part of the nozzle to be used.

In addition, since powder of the shaven carrier 1 is produced, the next process may be performed after the powder is removed by a method such as suction.

Process 2

The process 2 is a process that inserts the nozzle having the packing part at the tip thereof into the groove formed by the process 1 described above. In this process 2, the packing part is inserted into the groove formed in the process 1 so as to make close contact with the groove.

The nozzle 5 used here has the function as a path through which the solvent is supplied to dissolve the compound constituting the spot or the solution in which the sample has been dissolved is sucked. The nozzle described above may be a tube made of any known material and needs to have the packing part at the tip thereof.

The packing part is preferably made of a material that makes close contact with the groove formed in the process 1 and a base material layer with no space therebetween and thereby prevents the liquid from being discharged from the inside to the outside of the nozzle. Specifically, the packing part made of various rubber materials may be used. It should be noted here that not only the nozzle in which only the tip is made of an elastic body, but also the nozzle made of an elastic material in which the entire body functions as the packing part may be used.

Furthermore, since the nozzle 5 described above also functions as a path through which the solvent is provided and sucked, the nozzle 5 is preferably coupled to a pump, a sucking unit, and the like for these purposes. The unit for supplying and sucking the solvent described above is not particularly limited and any known unit may be used.

Process 3

The process 3 is a process that discharges the solvent through the nozzle inserted into the groove on the chromatography plate in the process 2. That is, the process 3 is a process that supplies the solvent to the part of the carrier in which the spot is formed. This selectively supplies the solvent only to the position of the spot, so that only the substance to be acquired is dissolved in the solvent without mixture with impurities.

The solvent to be used is not particularly limited as long as the sample to be acquired can be dissolved in the solvent and the solvent can be selected according to the purpose. In addition, it is enough to supply approximately 1 to 30 μl of the solvent.

Process 4

The process 4 is a process that finally acquires the target sample by sucking the solution in which the sample has been dissolved in the process 3 described above. This can recover and use the sample separated by thin layer chromatography. The sucking method is not particularly limited and may be a method that performs suction by decompression with a pump or the like.

The sample separated in this way may be provided for an analysis unit as is. That is, if the structure of a compound is clarified by analyzing the sample acquired in this way, the compound that is present can be clarified by thin layer chromatography that uses a very small quantity of sample and the compound can be associated with spot position. This clarifies the distillate position of the sample required in subsequent separation work, so subsequent work can be performed efficiently.

The analysis unit described above is not particularly limited as long as the analysis unit can perform measure of a solution, such as, for example, mass analysis, NMR, refractive index (RI), evaporative light scattering detector (ELSD), ultraviolet absorption analysis, visible light absorption analysis, and the like. In addition, the sample may be provided for the analysis unit after being isolated and undergoing the necessary operation instead of being introduced to the analysis unit directly.

The second aspect of the invention is a preparative device used for the preparative thin layer chromatography method according to the invention described above.

That is, it is difficult to manually perform all of the preparative thin layer chromatography method described above. Therefore, the inventor provides a preparative device that assists such work. This preparative device will be described in detail below with reference to FIG. 2.

Figure 2:
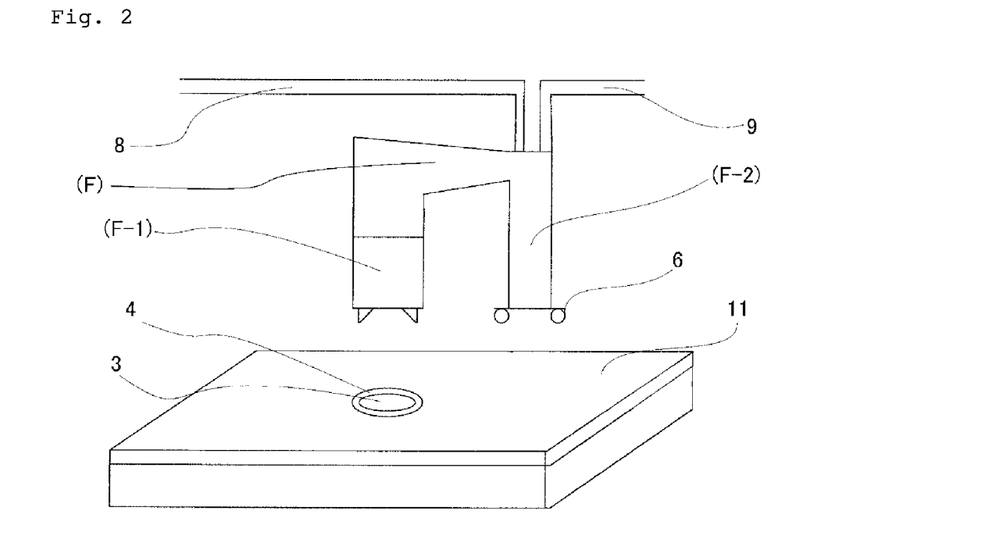
FIG. 2 is a schematic view illustrating an example of a preparative thin layer chromatography device according to the invention.

A preparative thin layer chromatography device according to the invention is a device that includes the groove forming unit (F-1) that performs the process 1 of the preparative thin layer chromatography method described above and the nozzle (F-2) having, at the tip thereof, the packing part 6 that performs the processes 2 to 4.

FIG. 2 illustrates a schematic view illustrating an example of this type of device. It should be noted here that the preparative thin layer chromatography device according to the invention is not limited to the device having the structure illustrated in FIG. 2. The device in FIG. 2 includes the groove forming unit (F-1) and the nozzle (F-2) that move up and down and lowers the groove forming unit (F-1) and the nozzle (F-2) onto a thin layer chromatography plate 11 mounted on a sample placement stage to perform predetermined work.

In the aspect illustrated in FIG. 2, the groove forming unit (F-1) and the nozzle (F-2) are provided as separate units and these units move up and down to achieve purposes in performing individual steps. However, both units may be provided in a single unit so that the groove forming unit (F-1) forms the groove, the groove forming unit is stored in the single unit, the nozzle (F-2) is exposed, and then the packing part 6 makes close contact with the groove 4. Although FIG. 2 assumes that the groove forming unit (F-1) and the nozzle (F-2) move up and down, the same purpose may be achieved by moving the thin layer chromatography plate 11 up and down.

The groove forming unit (F-1) described above may be a blade or a needle capable of shaving the carrier while pushing the blade or the needle against the carrier. The shape thereof may be the same as that of groove to be formed or the groove may be formed by rotating the groove forming unit that is a small blade or a needle while pushing the groove forming unit against the carrier. The formation of the groove by rotating the groove forming unit while pushing the groove forming unit against the carrier is preferable in that this method hardly fails and it is possible to form a highly uniform groove into which the packing part 6 of the nozzle (F-2) can be easily inserted.

Furthermore, the nozzle (F-2) described above includes a solvent supplying unit 8 and a sucking unit 9 such as a pump in addition to the packing part 6. The solvent supplying unit 8 is not particularly limited as long as the solvent supplying unit 8 can measure a predetermined amount of solvent in a solvent tank and supply the solvent to the nozzle (F-2) and may be any known unit. Furthermore, the solvent sucking unit 9 may be any known unit that can efficiently suck a very small quantity of the sample.

In addition, the preparative thin layer chromatography device according to the invention may prepare the plurality of groove forming units (F-1) and nozzles (F-2) so that these units and nozzles can be changed according to the size of a target spot. In addition, when extracting is performed on two or more spots of the thin layer chromatograph, if the same nozzle (F-2) is repeatedly used, the sample first extracted may remain and this sample may be mixed into the sample second extracted. In this case, the extracting described above can be performed with no problem by changing the nozzle (F-2) for each sample.

Furthermore, the nozzle (F-2) described above may have a cleaning unit. That is, when the nozzle (F-2) is used once and then the next extracting is performed as is, if the nozzle (F-2) is cleaned after the first extracting, the second and subsequent extracting can be performed continuously.

The preparative device according to the invention may have an analysis unit coupled to the nozzle (F-2). This enables the extracted sample to be automatically analyzed and the compound included in a spot to be identified. Since these operations can be performed automatically, the device can automatically acquire the analysis result of the compound only by selecting a spot of the thin layer chromatograph. In addition, analysis can be performed without a sample loss caused by extracting.

In addition to the requirements of the second aspect of the invention described above, the preparative device according to the third aspect of the invention can display the spot position on the thin layer chromatography plate as an image and acquire the spot component as described above of the spot specified by the operator based on the displayed image.

Only if the sample to be extracted is specified on the image, the preparative device described above can perform almost all of subsequent operations automatically, so the object of the invention described above can be achieved very simply and conveniently.

Specifically, the preferable aspect described above includes a thin layer chromatography plate placement unit (A), a spot detection light illuminating unit (B), a thin layer chromatography plate image taking unit (C), an image displaying unit (D) on which an image taken by the thin layer chromatography plate image taking unit (C) is displayed, a spot specifying unit (E) used by an operator to specify a spot position in the image displayed on the image displaying unit (D), and a collecting unit (F) that collects the spot in the position specified by the operator using the spot specifying unit (E). The second aspect of the invention is adopted as this collecting unit (F).

These units (A) to (F) above will be described in detail below with reference to FIGS. 3 to 6.

The thin layer chromatography plate placement unit (A) according to the preferable aspect described above is a stage used to place the thin layer chromatography plate in the device. Since the components constituting the spot are acquired from the thin layer plate having undergone thin layer chromatography in the invention, the thin layer chromatography plate needs to be placed in a predetermined position in the device to perform such processing. The thin layer chromatography plate placement unit (A) is a placement unit for this purpose. In the invention, work for extracting is performed by individual elements indicated below on the thin layer chromatography plate placed in a particular position.

The preparative thin layer chromatography device according to the invention illuminates the thin layer chromatography plate placed as described above with detection light using the spot detection light illuminating unit (B) and takes an image of the thin layer chromatography plate using the thin layer chromatography plate image taking unit (C).

The spot detection light illuminating unit (B) described above is a unit that visualizes the spot by illuminating the thin layer chromatography plate with detection light. Since the spot on the thin layer chromatography plate is colorless in many cases, the spot cannot be visually recognized in the original state. In addition, even when a colored spot is sharply displayed on the image displaying unit (D) that will be described in detail below, illumination with detection light is necessary. Accordingly, the spot detection light illuminating unit (B) visualizes the spot by illumination with detection light such as ultraviolet light or visible light. As a unit that performs illumination with two or more types of detection light, these types of detection light may be switched.

The thin layer chromatography plate image taking unit (C) described above is an image taking unit that images the thin layer chromatography plate for which the spot has been visualized by the spot detection light illuminating unit (B). As described above, it is not preferable for the operator to be exposed directly to spot detection light in the invention. The invention observes the thin layer chromatography plate by taking an image of the thin layer chromatography plate using the thin layer chromatography plate image taking unit (C) and displaying the image on the image displaying unit (D) described below. This enables the operator to observe the thin layer chromatography plate without exposure to the detection light used for illumination.

The thin layer chromatography plate image taking unit (C) may be a video camera that takes a moving image, a camera that takes a still image, or the like, but a video camera is more preferable. The video camera, a camera, or the like used here is not particularly limited and may be a general one.

The image displaying unit (D) described above is a unit on which an image taken by the thin layer chromatography plate image taking unit (C) described above is displayed. A moving image or a still image taken by the thin layer chromatography plate image taking unit (C) described above is displayed on the image displaying unit (D) described above and the spot to be acquired is specified on this screen displayed. This enables the spot to be specified with a simple and convenient method, thereby reducing loads on the operator.

The image displaying unit (D) described above may be any known image displaying unit such as a liquid crystal display.

The spot specifying unit (E) described above is a unit that specifies the spot to be collected among the spots on the thin layer chromatography plate displayed on the image displaying unit (D) described above. That is, this unit specifies the part of the image displaying unit (D) to which the collecting unit (F) is applied.

The spot specifying unit (E) described above is not particularly limited and may be, for example, a method that specifies the position by moving a cursor using a unit such as a tenkey or a mouse, a method that makes direct specification by touching a point on the image displaying unit (D) using the image displaying unit (D) as a touch panel, or the like.

The collecting unit (F) described above is a unit that collects the spot component in a spot position specified by the operator using the spot specifying unit (E) described above. This collecting unit (F) uses the second aspect of the invention including the groove forming unit (F-1) and the nozzle (F-2) described above and this can efficiently acquire the component constituting the spot. Furthermore, the collecting unit (F) can move to any position on the thin layer chromatography plate placed on the thin layer chromatography plate placement unit (A).

The preparative thin layer chromatography device according to the invention may further include an analyzing unit (G) that analyzes the components of the extracted spots. If qualitative analysis can be made based on the thin layer chromatography plate, when preparative chromatography is performed after that, the spots that are important as the extracted targets are clarified in advance. Accordingly, the chromatography conditions (such as, for example, the solvent type to be used and the gradient method) for accurately and efficiently acquiring the target spots can be predicted before performing preparative chromatography. Accordingly, this also contributes to improvement of the efficiency of preparative chromatography itself.

Furthermore, analysis by the analyzing unit (G) may also clarify the mixture of a plurality of compounds within one spot. When such a fact is clarified during execution of thin layer chromatograph, by reviewing the preparative method (for example, by changing the chromatography conditions), the efficiency of subsequent experiments can be further improved.

The analyzing unit (G) described above is not particularly limited and may be, for example, mass analysis, NMR, refractive index (RI), evaporative light scattering detector (ELSD), ultraviolet absorption analysis, visible light absorption analysis, and the like. In addition, the analyzing unit (G) may have such analyzing units so as to select a desired analyzing unit according to the type of the compound to be analyzed. Of these analyzing units, mass analysis is particularly preferable.

The preparative thin layer chromatography device according to the aspect described above will be described more specifically below with reference to the drawings. FIGS. 3 to 6 represent examples of the aspect, but the invention is not limited to the examples illustrated in FIGS. 3 to 6.

Figure 3:
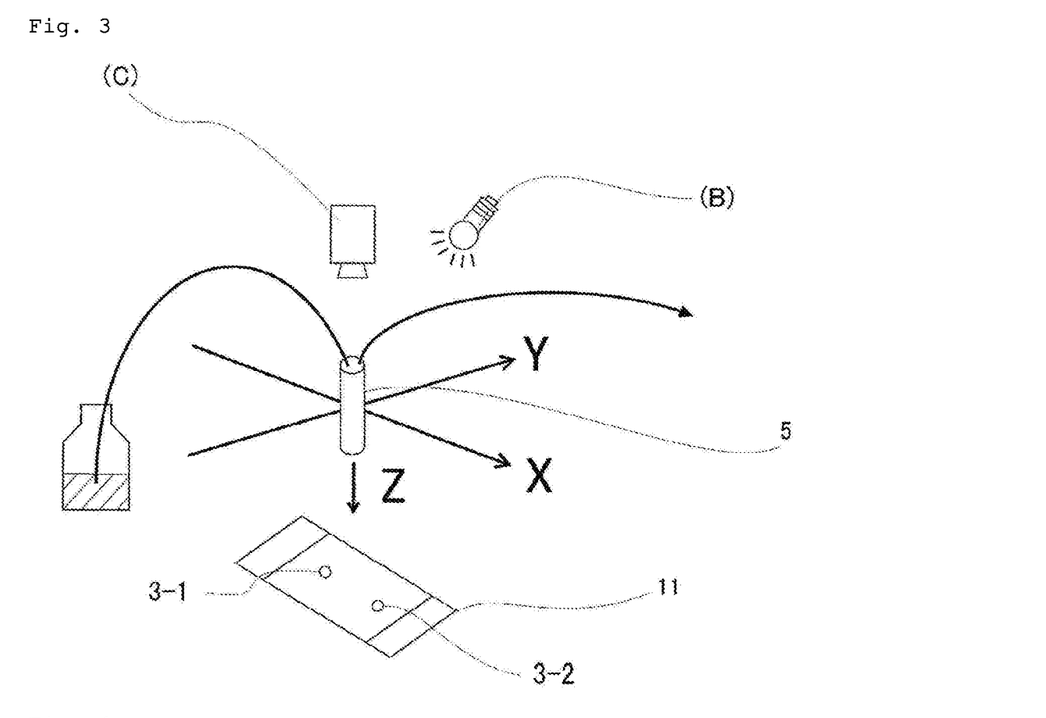
FIG. 3 is a schematic view illustrating an example of the preparative thin layer chromatography device according to the invention.
Figure 4:
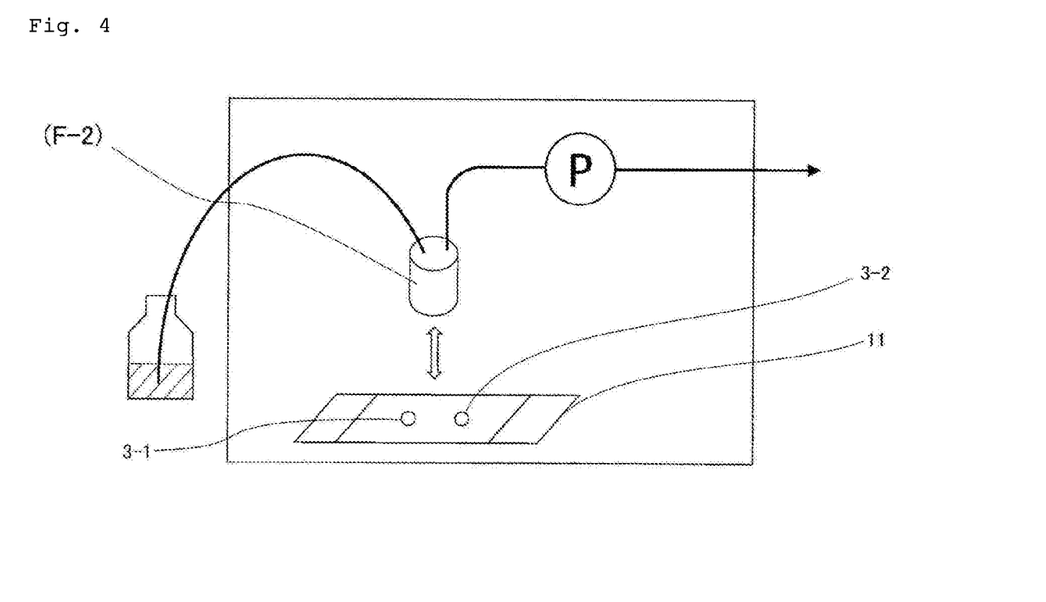
FIG. 4 is a schematic view illustrating an example of a collecting unit (F) according to the invention.

FIG. 3 illustrates an example of the structure including the spot detection light illuminating unit (B), the thin layer chromatography plate image taking unit (C), and the collecting unit (F) in the preparative thin layer chromatography device according to the invention.

In FIG. 3, deployment has been made on a thin layer chromatography plate 11 and a first spot 3-1 and a second spot 3-2 are present. The thin layer chromatography plate 11 described above is placed on the thin layer chromatography plate placement unit (A) (not illustrated) in the device.

The spot detection light illuminating unit (B) illuminates the thin layer chromatography plate 11 described above with light to make the spot 3-1 and the spot 3-2 visually recognizable. The thin layer chromatography plate image taking unit (C) is a unit that takes an image of the thin layer chromatography plate 11 described above.

The preparative thin layer chromatography device according to the invention further includes the collecting unit (F). This collects the spot component in a specified spot 2-1. FIG. 3 illustrates the nozzle (F-2) as the collecting unit (F). The invention of course also has the groove forming unit (F-1) described above as the collecting unit (F). In addition, the groove forming unit (F-1) and the nozzle (F-2) are movable and can move to specified positions on the thin layer chromatography plate according to an instruction.

Figure 5:
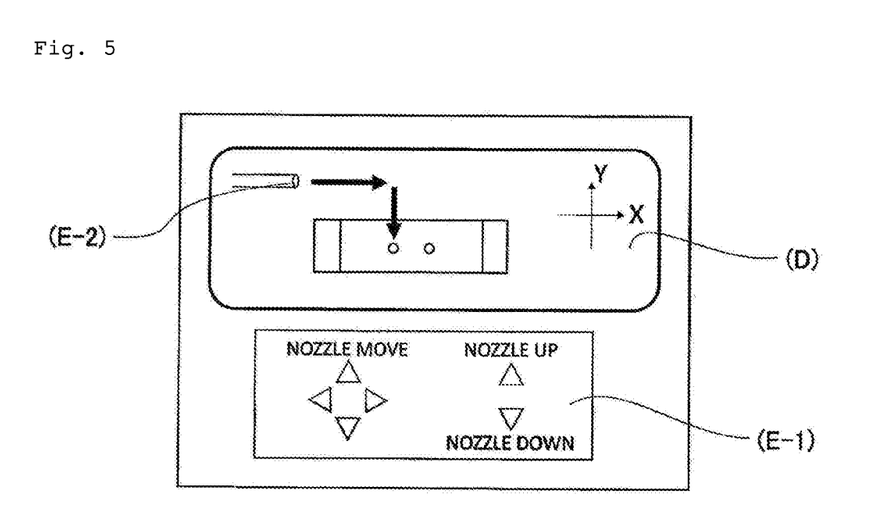
FIG. 5 is a schematic view illustrating an example of an image displaying unit (D) of the preparative thin layer chromatography device according to the invention.

Furthermore, FIG. 5 illustrates examples of aspects of the image displaying unit (D) and the spot specifying unit (E).

The image displaying unit (D) displays an image of the thin layer chromatography plate 11 taken by the thin layer chromatography plate image taking unit (C). This enables the operator to visually recognize the positions of spots on the thin layer chromatography plate 11.

In the aspect illustrated in FIG. 5, the spot specifying unit (E) has a cursor (E-2) that displays the position of the nozzle (F-2) and a cursor position moving unit (E-1).

The cursor position moving unit (E-1) specifies the positions in the X-axis and Y-axis directions of the cursor (E-2) and thereby determines the position at which the collecting unit (F) performs collection. When the position is determined, the collecting unit (F) operates and acquires the spot component constituting the spot on the thin layer chromatography plate 11 based on the structure described above.

By repeating the operation described above on a plurality of spots on the thin layer chromatography plate 11, the spot components of the plurality of spots can be acquired.

Figure 6:
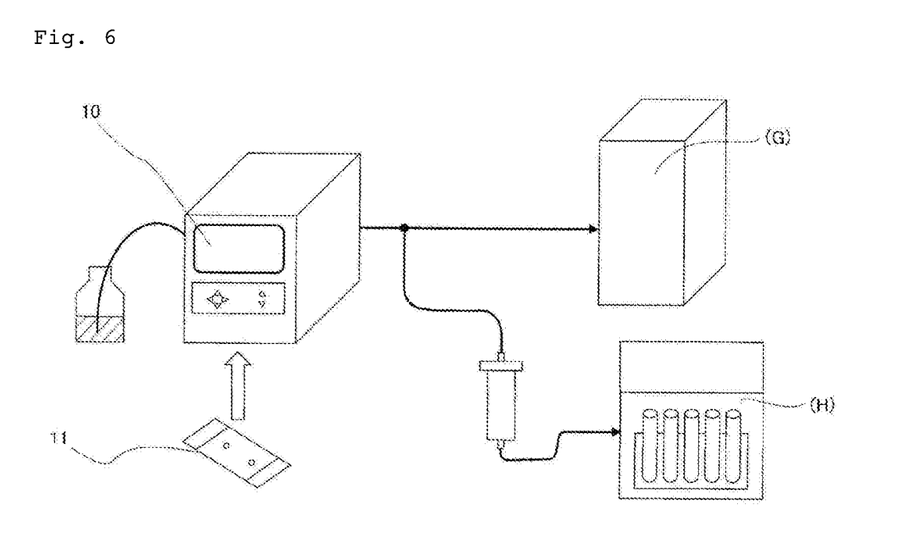
FIG. 6 is a schematic view illustrating an example of the preparative thin layer chromatography device according to the invention.

FIG. 6 illustrates an example of the entire structure of the preparative thin layer chromatography device according to the invention. The operator mounts the thin layer chromatography plate 11 for which deployment has been made in a predetermined place in a preparative thin layer chromatography device 10 according to the invention. Then, the operator acquires a predetermined spot component with the method described above and sends the acquired spot component to the analyzing unit (G) and/or a preparative unit (H).

The invention is also a preparative thin layer chromatography method that performs a pretreatment process before a process that discharges a solvent onto a spot through a nozzle and a process that sucks the solvent in which a spot component has been dissolved, and then removes a solid part after the pretreatment.

The thin layer chromatography plate is a carrier layer formed on the base material sheet by compressing carrier particles. Accordingly, many spaces are present in the carrier and the solvent diffuses through the spaces into the thin layer chromatography plate. Such diffusion may prevent the solvent from being sucked favorably.

Accordingly, processing for preventing the solvent from diffusing into the carrier is performed as the pretreatment. However, the pretreatment may cause carrier powder to be present in the vicinity of the spot.

On the other hand, in the pretreatment described above, part of the carrier is removed to solve the problems described above and carrier powder is attached to the surface of the chromatography plate. When the solvent is discharged or sucked in the state in which the carrier powder is present on the surface of the chromatography plate, the carrier powder is sucked into the nozzle and the device may become defective due to clogging of a pipe or the like. In addition, the powder causes a space between the tip of the nozzle and the thin layer chromatography plate and suction may not be performed efficiently.

The invention has a process that removes the solid part around the spot after the pretreatment to solve the problems described above.

Figure 7:
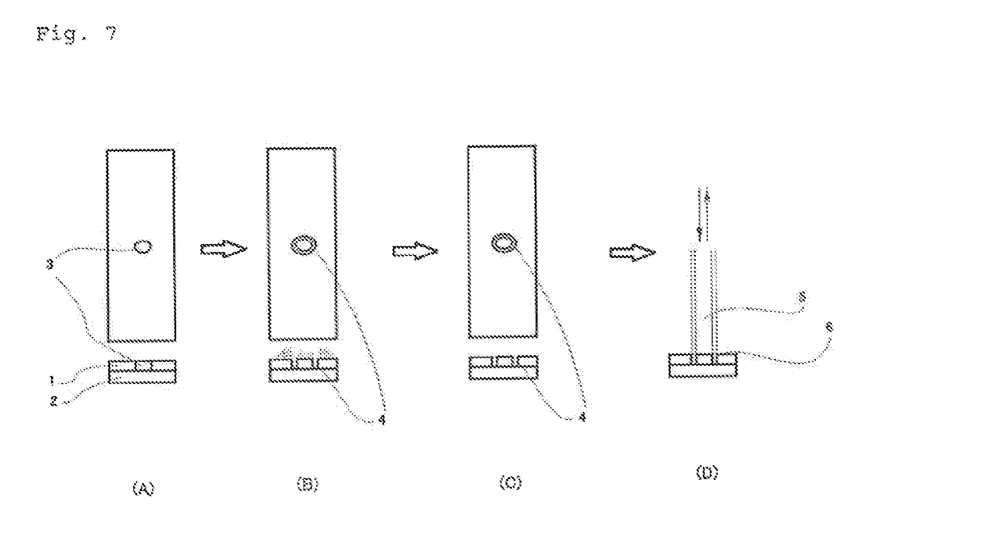
FIG. 7 is a schematic view illustrating a procedure of a first aspect of the preparative thin layer chromatography method according to the invention.
Figure 8:
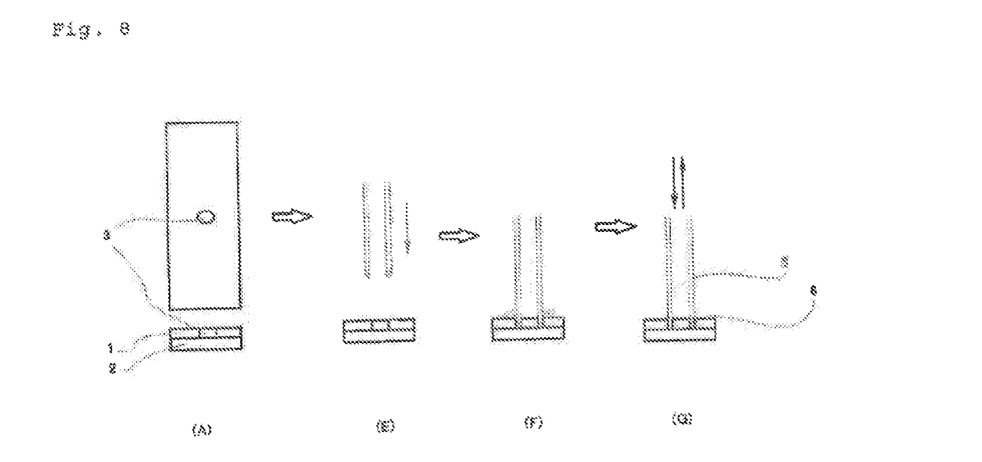
FIG. 8 is a schematic view illustrating a procedure of a second aspect of the preparative thin layer chromatography method according to the invention.

The pretreatment described above may be, for example, a process that forms a groove by removing the carrier at the circumferential edge of the spot to be extracted, a method that pushes a nozzle having a cylindrical blade at the tip thereof against the thin layer chromatography plate, or the like. They are illustrated in FIG. 7 and FIG. 8. It should be noted here that the pretreatment performed in the invention is not limited to those illustrated in FIG. 7 and FIG. 8 below.

FIG. 7 is a schematic view illustrating the invention when the pretreatment in the process 1 is a process that forms a groove by removing the carrier at the circumferential edge of the spot.

FIG. 7A illustrates the thin layer chromatography plate on which the sample has been deployed. The drawing above is a schematic view illustrating the thin layer chromatography plate seen from above and the drawing below is a schematic view illustrating a cross section of the spot position. The thin layer chromatography plate has the structure in which the carrier 1 is formed on the supporting plate 2 and the spot 3 having undergone thin layer chromatography includes separated compounds in the spot. The sample to be acquired in the invention is present in the carrier 1.

The pretreatment process 1 in the aspect illustrated in FIG. 7 is a process that forms the groove 4 by removing the carrier at the circumferential edge of the spot from which the sample is acquired, as illustrated in FIG. 7B. Since the carrier is a layer made of fine powder such as silica, the carrier can be easily removed by shaving the surface thereof using a blade, a needle, or the like. Such removal of the carrier is preferably performed until the supporting plate 2 is exposed to the surface. This is because, if the carrier 1 remains in the removed part even after removal, the solvent leaks externally through the remaining part and an object of the invention may not be achieved sufficiently.

The process 2 of the invention is a process that removes the solid part produced when the carrier is removed in the process 1 described above. The main solid part is fine powder and the like that are produced when the thin layer chromatography plate is shaven.

The purpose for removing residue in this process is to solve the above problems caused because fine powder and the like produced when a groove is formed in the process 1 remain on the chromatography plate.

The process 3 in the aspect illustrated in FIG. 7 is a process that inserts the nozzle 5 having the packing part 6 at the tip thereof into the groove 4 formed in the process 3, as illustrated in FIG. 7C.

The nozzle used here has a tubular shape with a hollow part through which liquid can pass and has the packing part 6 at the tip thereof. The packing part is made of a material having high adhesiveness like an elastic body such as rubber. By inserting the packing part into the groove formed in the process 1 described above, the spot part 3 of the carrier including the sample is blocked from the other part of the carrier and liquid cannot move between these parts.

When the solvent is discharged through the nozzle in the state described above, in the process 4 the discharged solvent is supplied only to the spot part 3 and does not diffuse into the other part of the carrier. Accordingly, a component other than the target spot 3 is not mixed and, in the process 5 to be performed next, liquid can be efficiently sucked and the target sample can be recovered in a high yield.

FIG. 8 is a schematic view illustrating the invention when the process 1 is a method that pushes the nozzle having a cylindrical blade at the tip thereof against the thin layer chromatography plate.

FIG. 8A illustrates the thin layer chromatography plate on which the sample has been deployed. In the method illustrated in FIG. 8, the process 1 is a process that pushes the nozzle having a cylindrical blade against the thin layer chromatography plate (from FIG. 8E to FIG. 8F). In this process, the blade is preferably pushed against the supporting plate so as to make contact with supporting plate as illustrated in FIG. 8F to prevent the liquid from circulating between the inside and the outside of the nozzle. This process produces a solid part (shaven residual) and this solid part is present around the blade (FIG. 8F).

The invention removes the solid part in the process 2 and then discharges and sucks the solvent using the nozzle having a cylindrical blade. This can solve various problems caused by the solid part as in the method described above in FIG. 7.

When the solvent is discharged through the nozzle in the process 4 in the state described above, the discharged solvent is supplied only to the spot part 3 and does not diffuse into the other part of the carrier. Accordingly, a component other than the target spot 3 is not mixed and, in the process 5 to be performed next, the liquid can be efficiently sucked and the target sample can be recovered in a high yield.

The individual processes will be described more specifically below.

Process 1 in the First Aspect

The case in which the process 1 is a process that forms the groove 4 by removing the carrier at the circumferential edge of the spot will be described specifically. The method for performing the process described above is not particularly limited and may be a method that pushes the blade shaped like the spot, a method that shaves the carrier by following the surface using a sharp shaving member such as a needle or a blade, or the like.

The groove described above is preferably formed by rotating a groove forming unit such as a blade or a needle while pushing the groove forming unit against the carrier. Since the method described above can form a uniform groove stably, the sample can be acquired without causing a trouble in the following process.

The shape and the size of the groove to be formed is not particularly limited and the groove may have any size and any shape according to the purpose. However, since the packing part is inserted into the formed groove in the subsequent process, the size and the shape need to substantially coincide with the shape of the packing part of the nozzle to be used.

Process 1 in the Second Aspect

The case in which the process 1 is a method that pushes the nozzle having a cylindrical blade at the tip thereof against the thin layer chromatography plate will be described specifically. The method for performing the process described above is not particularly limited and pushes the blade shaped like a spot against the plate. The second aspect is the same as the first aspect except that the nozzle having a blade at the tip thereof is used and the edge part of the blade isolates the spot part of the carrier from the outside.

In this aspect, it is necessary that the blade is hollow and the solvent can flow through the blade. Accordingly, the material of the blade preferably has corrosion resistance to organic solvents.

In this aspect, the blade also functions as an isolation wall that prevents the solvent from circulating between the inside and the outside of the spot. Accordingly, the pressure for pushing the blade against the chromatography plate may be controlled so as to preferably achieve the function described above.

Process 2

The process 2 is a process that removes the solid part around the spot from which the sample is acquired on the thin layer chromatography plate produced in the process 1.

The method for removing the residual described above is not particularly limited and may be, for example, a method that sucks dust particles or the like or a method that blows out the residual by blowing gas or the like onto the residual using a gas blowout mechanism. A sucking unit is preferably used to prevent the work environment from deteriorating.

Figure 9:
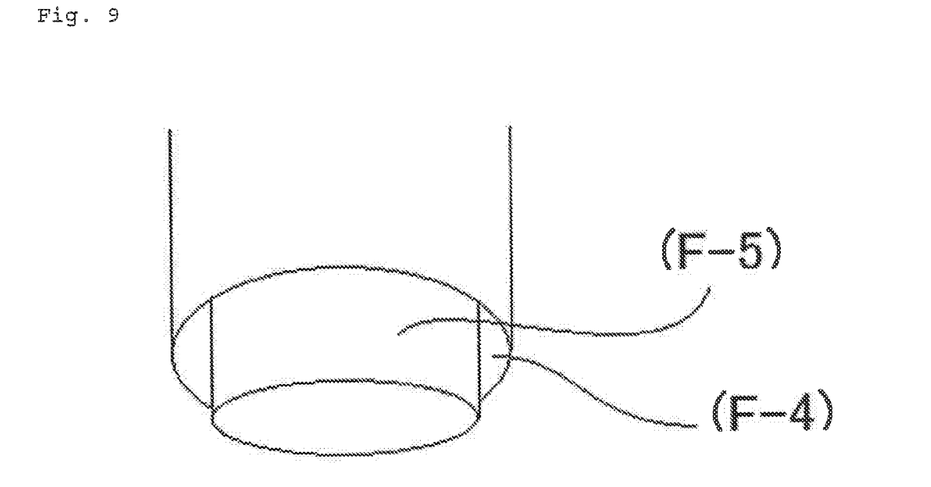
FIG. 9 is a schematic view illustrating a state in which a sucking unit is provided in a groove forming unit or an outer periphery part of a blade.

For example, the sucking unit may have an air suction section (F-4) around a blade (F-5) as illustrated in FIG. 9. In FIG. 9, the sucking part sucks air from the space around the blade.

When the sucking unit illustrated in FIG. 9 is used in the first aspect, on the assumption that the blade part of the blade (F-5) solely moves up and down, a groove may be formed by the blade (F-5), the blade may be moved up, and then the sucking part may be operated.

When the sucking unit illustrated in FIG. 9 is used in the second aspect, the sucking unit preferably sucks the circumferential edge while bringing the blade (F-5) into close contact with the chromatography plate. This can efficiently remove the solid part.

Process 3

The process 3 is a process that discharges the solvent through the nozzle onto the spot of the thin layer chromatography plate.

In the first aspect described above, the nozzle having the packing part at the tip thereof is inserted into the groove formed in the process 1 described above and then the solvent is discharged. In the first aspect, in this process 3, the packing part is preferably inserted into the groove formed in the process 1 so as to make close contact with the groove.

The nozzle 5 used here has the function of a path through which the solvent is supplied to dissolve the compound constituting the spot or the solution in which the sample has been dissolved is sucked. The nozzle described above may be a tube made of any known material. In the first aspect, the tip part thereof needs to have a packing part. In the second aspect, the tip part thereof needs to have the blade.

The packing part described above is preferably made of a material that has elasticity making close contact with the groove and the base material layer formed in the process 1 described above and thereby prevents liquid from being discharged from the inside to the outside of the nozzle. Specifically, the packing part made of various types of rubber materials may be used. It should be noted here that not only the nozzle in which only the tip is made of an elastic body, but also the nozzle made of an elastic material in which the entire body functions as the packing part may be used.

Furthermore, since the nozzle 5 described above also functions as a path through which the solvent is supplied or sucked, the nozzle 5 is preferably coupled to a pump, a sucking unit, and the like for these purposes. The unit that supplies or sucks the solvent described above is not particularly limited and any known unit may be used.

In the second aspect described above, the process 3 discharges the solvent to the nozzle part of the nozzle having a cylindrical blade at the tip thereof and supplies the solvent to the tip part of the nozzle. Since the nozzle 5 described above also functions as a path through which the solvent is supplied or sucked, the nozzle 5 is desirably coupled to a pump, a sucking unit or the like for these purposes. The supplying and sucking units for the solvent described above are not particularly limited and may be any known units.

The solvent to be used in the process 3 is not particularly limited as long as the sample to be acquired can be dissolved in the solvent and the solvent can be selected according to the purpose. In addition, it is enough to supply approximately 1 to 30 µl of the solvent.

Process 4

The process 4 is a process that finally acquires the target sample by sucking the solution in which the sample has been dissolved in the process 3 described above. This can recover and use the sample separated by thin layer chromatography. The sucking method is not particularly limited and may be a method that performs suction by decompression with a pump.

The sample separated in this way may be provided for an analysis unit as is. That is, if the structure of a compound is clarified by analyzing the sample acquired in this way, the compound that is present is clarified by thin layer chromatography that uses a very small quantity of sample and the compound can be further associated with spot positions. This clarifies the distillate position of the sample required in subsequent separation work, so subsequent work can be performed efficiently.

The analysis unit described above is not particularly limited as long as the analysis unit can perform measure of a solution, such as, for example, mass analysis, NMR, refractive index (RI), evaporative light scattering detector (ELSD), ultraviolet absorption analysis, visible light absorption analysis, and the like. In addition, the sample may be provided for the analysis unit after being isolated and undergoing the necessary operation instead of being introduced to the analysis unit directly.

The invention is also a preparative device used for the preparative thin layer chromatography method according to the invention described above.

That is, it is difficult to manually perform all of the preparative thin layer chromatography method described above. Therefore, the inventor provides a preparative device that assists such work. This preparative device of the first aspect will be described in detail below with reference to FIG. 10.

The preparative thin layer chromatography device according to the invention is a device that includes a pretreatment unit that performs the process 1 of the preparative thin layer chromatography method described above, a nozzle that performs the processes 3 and 4, and a residual removing unit that performs the process 2.

Figure 10:
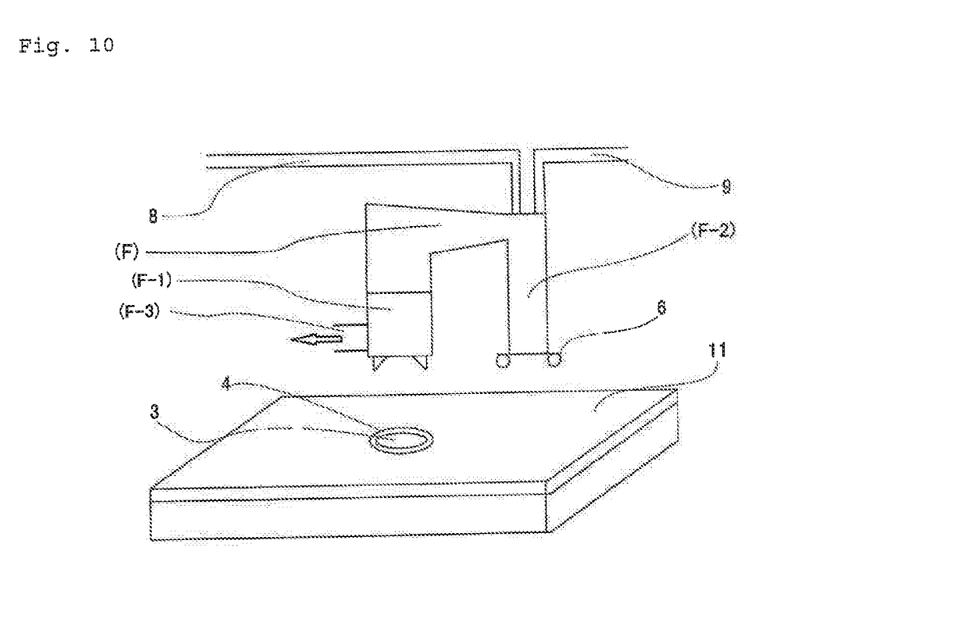
FIG. 10 is a schematic view illustrating an example of a first aspect of the preparative thin layer chromatography device according to the invention.
Figure 11:
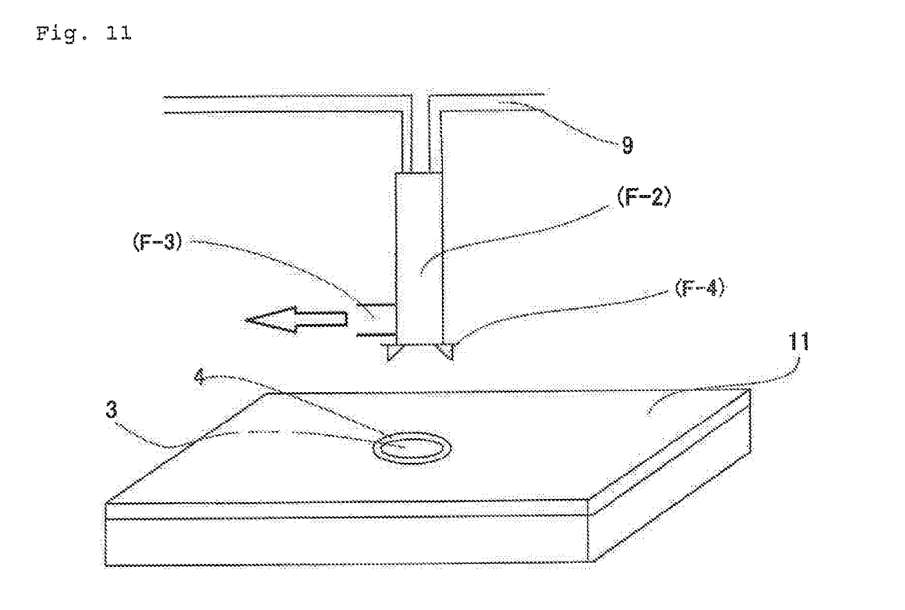
FIG. 11 is a schematic view illustrating an example of a second aspect of the preparative thin layer chromatography device according to the invention.

FIGS. 10 and 11 illustrate schematic views illustrating an example of this type of device. It should be noted here that the preparative thin layer chromatography device according to the invention is not limited to the devices having the structures illustrated in FIGS. 10 and 11.

FIG. 10 is a schematic view illustrating a preparative thin layer chromatography device corresponding to the first aspect described above.

The device in FIG. 10 includes the groove forming unit (F-1) and the nozzle (F-2) that move up and down and lowers the groove forming unit (F-1) and the nozzle (F-2) onto the thin layer chromatography plate 11 mounted on the sample placement stage to perform predetermined work. In addition, the device further includes the residual removing unit (F-3) that removes the solid part.

In the aspect illustrated in FIG. 10, the groove forming unit (F-1) and the nozzle (F-2) are provided as separate units and these units move up and down to achieve the purpose in performing individual steps. However, both units may be provided in a single unit so that the groove forming unit (F-1) forms the groove, the groove forming unit may be stored in the single unit, the nozzle (F-2) may be exposed, and then the packing part 6 may make close contact with the groove 4. Although FIG. 10 assumes that the groove forming unit (F-1) and the nozzle (F-2) move up and down, the same purpose may be achieved by moving the thin layer chromatography plate 11 up and down.

The groove forming unit (F-1) described above may be a blade or a needle that can shave the carrier while pushing it against the carrier. The shape thereof may be the same as that of groove to be formed or the groove may be formed by rotating the groove forming unit that is a small blade or a needle while pushing the groove forming unit against the carrier. The formation of the groove by rotating the groove forming unit while pushing the groove forming unit against the carrier is preferable in that this method hardly fails and it is possible to form a highly uniform groove into which the packing part 6 of the nozzle (F-2) can be easily inserted.

Furthermore, the nozzle (F-2) described above includes the solvent supplying unit 8 and the sucking unit 9 such as a pump in addition to the packing part 6. The solvent supplying unit 8 is not particularly limited as long as the solvent supplying unit 8 can measure a predetermined amount of solvent in a solvent tank and supply the solvent to the nozzle (F-2) and may be any known unit. Furthermore, the solvent sucking unit 9 may be any known unit that can efficiently suck a very small quantity of the sample.

In addition, the preparative thin layer chromatography device according to the invention may prepare the plurality of groove forming units (F-1) and nozzles (F-2) so that the groove forming unit (F-1) and nozzle (F-2) are changed according to the size of a target spot. In addition, when extracting is performed on two or more spots of the thin layer chromatograph, if the same nozzle (F-2) is repeatedly used, the sample first extracted may remain and this sample may be mixed into the sample second extracted In this case, the extracting described above can be performed with no problem by changing the nozzle (F-2) for each sample.

Furthermore, the nozzle (F-2) described above may have a cleaning unit. That is, when the nozzle (F-2) is used once and then the next extracting is performed as is, if the nozzle (F-2) is cleaned after the first extracting, the second and subsequent extracting can be performed continuously.

The preparative device according to the invention may have an analysis unit coupled to the nozzle (F-2). This enables the extracted sample to be automatically analyzed and the compound included in a spot to be identified. Since these operations can be performed automatically, the device can automatically acquire the analysis result of the compound only by selecting a spot of the thin layer chromatography. In addition, analysis can be performed without a sample loss caused by extracting.

The device illustrated in FIG. 9 can be used as the unit (F-3) according to the invention.

The aspect illustrated in FIG. 11 corresponds to the second aspect described above. That is, the aspect further includes the nozzle (F□2), the blade (F-5) mounted at the end portion of the nozzle, and the residual removing unit (F-3). In the aspect illustrated in FIG. 11, the device basically the same as in FIG. 10 may be used.

The preparative device according to the invention may be a device capable of displaying a spot position on the thin layer chromatography plate as an image and acquiring the spot component as described above for the spot specified by the operator based on the displayed image.

Only if the sample to be extracted is specified on the image, the preparative device described above can perform almost all of subsequent operations automatically, so the object of the invention described above can be achieved very simply and conveniently.

The preparative thin layer chromatography method according to the invention can extracted and analyze the compound constituting a spot of thin layer chromatography. This can make processes of chemical synthesis simple and convenient and improve the efficiency of research.

EXPLANATION OF REFERENCES

1 carrier
2 supporting plate 2
3 spot
3-1 first spot
3-2 second spot
4 groove
5 nozzle
6 packing part
8 solvent supplying unit
9 sucking unit
10 thin layer chromatography device
11 thin layer chromatography plate

What is claimed is:

1. A preparative thin layer chromatography method for extracting a spot from a thin layer chromatography plate, the preparative method comprising:
   a process 1 that forms a groove by removing a carrier at a circumferential edge of the spot to be extracted;
   a process 2 that inserts a nozzle having a packing part comprising an elastic body at a tip thereof into the groove formed in the process 1;
   a process 3 that discharges a solvent through the nozzle; and
   a process 4 that sucks the solvent in which a spot component has been dissolved.

2. The preparative thin layer chromatography method according to claim 1,
   wherein the groove in the process 1 is formed by rotating a groove forming unit while pushing the groove forming unit against the carrier.

3. A preparative thin layer chromatography device that performs the preparative thin layer chromatography method according to claim 1, the preparative device comprising:
   a groove forming unit that forms a groove by removing the carrier at the circumferential edge of the spot; and a nozzle having, at the tip thereof, a packing part comprising an elastic body insertable into the groove formed by the groove forming unit.

4. A preparative thin layer chromatography device that performs the preparative thin layer chromatography method according to claim 1, the preparative device comprising:
- a thin layer chromatography plate placement unit;
- a spot detection light illuminating unit;
- a thin layer chromatography plate image taking unit;
- an image displaying unit in which an image taken by the thin layer chromatography plate image taking unit is displayed;
- a spot specifying unit used by an operator to specify a spot position in the image displayed in the image displaying unit; and
- a collecting unit that collects a spot at the position specified by the operator using the spot specifying unit, the collecting unit including a groove forming unit that forms the groove by removing the carrier at the circumferential edge of the spot and a nozzle having, at the tip thereof, a packing part comprising an elastic body insertable into the groove formed by the groove forming unit.

5. A preparative thin layer chromatography device that performs the preparative thin layer chromatography method according to claim 2, the preparative device comprising:
- a groove forming unit that forms a groove by removing the carrier at the circumferential edge of the spot; and
- a nozzle having, at the tip thereof, a packing part comprising an elastic body insertable into the groove formed by the groove forming unit.

6. A preparative thin layer chromatography device that performs the preparative thin layer chromatography method according to claim 2, the preparative device comprising:
- a thin layer chromatography plate placement unit;
- a spot detection light illuminating unit;
- a thin layer chromatography plate image taking unit;
- an image displaying unit in which an image taken by the thin layer chromatography plate image taking unit is displayed;
- a spot specifying unit used by an operator to specify a spot position in the image displayed in the image displaying unit; and
- a collecting unit that collects a spot at the position specified by the operator using the spot specifying unit, the collecting unit including a groove forming unit that forms the groove by removing the carrier at the circumferential edge of the spot and a nozzle having, at the tip thereof, a packing part comprising an elastic body insertable into the groove formed by the groove forming unit.

7. The preparative thin layer chromatography method according to claim 1,
wherein the elastic body is rubber.

8. The preparative thin layer chromatography device according to claim 3,
wherein the elastic body is rubber.

9. The preparative thin layer chromatography device according to claim 4,
wherein the elastic body is rubber.

10. The preparative thin layer chromatography device according to claim 5,
wherein the elastic body is rubber.

11. The preparative thin layer chromatography device according to claim 6,
wherein the elastic body is rubber.

12. A preparative thin layer chromatography method for dispensing a spot from a thin layer chromatography plate, the preparative method comprising:
- a process 1 that performs pretreatment for preventing a solvent from diffusing into a carrier layer in the thin layer chromatography plate;
- a process 2 that removes a solid part around the spot from which a sample is acquired on the thin layer chromatography plate, the solid part being generated in the process 1;
- a process 3 that discharges a solvent onto the spot on the thin layer chromatography plate through a nozzle having a packing part comprising an elastic body at a tip thereof; and
- a process 4 that sucks the solvent in which a spot component has been dissolved.

13. The preparative thin layer chromatography method according to claim 12,
wherein the process 1 is a process that forms a groove by removing the carrier at the circumferential edge of the spot to be dispensed.

14. The preparative thin layer chromatography method according to claim 13,
wherein the groove in the process 1 is formed by rotating a groove forming unit while pushing the groove forming unit against the carrier.

15. A preparative thin layer chromatography device that performs the preparative thin layer chromatography method according to claim 12, the preparative device comprising:
- a pretreatment unit that performs the process 1;
- a solid part removing unit that removes the solid part around the spot; and
- a nozzle having a packing part comprising an elastic body at a tip thereof that discharges the solvent onto the spot or sucks the solvent from the spot.

16. The preparative thin layer chromatography device according to claim 15,
wherein the pretreatment unit is a groove forming unit that forms the groove by removing the carrier at the circumferential edge of the spot.

17. A preparative thin layer chromatography device that performs the preparative thin layer chromatography method according to claim 13, the preparative device comprising:
- a pretreatment unit that performs the process 1;
- a solid part removing unit that removes the solid part around the spot; and
- a nozzle having a packing part comprising an elastic body at a tip thereof that discharges the solvent onto the spot or sucks the solvent from the spot.

18. The preparative thin layer chromatography device according to claim 17,
wherein the pretreatment unit is a groove forming unit that forms the groove by removing the carrier at the circumferential edge of the spot.

19. A preparative thin layer chromatography device that performs the preparative thin layer chromatography method according to claim 14, the preparative device comprising:
- a pretreatment unit that performs the process 1;
- a solid part removing unit that removes the solid part around the spot; and
- a nozzle having a packing part comprising an elastic body at a tip thereof that discharges the solvent onto the spot or sucks the solvent from the spot.

20. The preparative thin layer chromatography device according to claim 19, wherein the pretreatment unit is a groove forming unit that forms the groove by removing the carrier at the circumferential edge of the spot.

* * * * *